(12) United States Patent
Andreasen et al.

(10) Patent No.: US 10,513,315 B2
(45) Date of Patent: Dec. 24, 2019

(54) ARRANGEMENT FOR ATTACHING A TOWING LINE TO A SPREADING DEVICE

(71) Applicant: Thyborøn Skibssmedie A/S, Thyborøn (DK)

(72) Inventors: Peder Stausholm Andreasen, Thyborøn (DK); Pétur Jensen, Thyborøn (DK)

(73) Assignee: Thyborøn Skibssmedie A/S, Thyborøn (DK)

( * ) Notice: Subject to any disclaimer, the term of this patent is extended or adjusted under 35 U.S.C. 154(b) by 0 days.

(21) Appl. No.: 16/085,616

(22) PCT Filed: Mar. 17, 2017

(86) PCT No.: PCT/DK2017/050077
§ 371 (c)(1),
(2) Date: Sep. 17, 2018

(87) PCT Pub. No.: WO2017/157400
PCT Pub. Date: Sep. 21, 2017

(65) Prior Publication Data
US 2019/0071152 A1  Mar. 7, 2019

(30) Foreign Application Priority Data

Mar. 18, 2016 (DK) ................ 2016 70156
Sep. 15, 2016 (DK) ................ 2016 70711

(51) Int. Cl.
*B63B 21/66* (2006.01)
*G01V 1/38* (2006.01)
(Continued)

(52) U.S. Cl.
CPC .............. *B63B 21/66* (2013.01); *A01K 73/04* (2013.01); *A01K 73/045* (2013.01); *A01K 73/05* (2013.01); *G01V 1/3826* (2013.01); *G01V 1/38* (2013.01)

(58) Field of Classification Search
CPC ........ B63B 21/66; A01K 73/04; A01K 73/045
See application file for complete search history.

(56) References Cited

U.S. PATENT DOCUMENTS

| 3,137,264 A | 6/1964 | Brainard |
| 4,719,987 A | 1/1988 | George |

(Continued)

FOREIGN PATENT DOCUMENTS

| EP | 0562780 A1 | 9/1993 |
| EP | 1987715 A1 | 11/2008 |

(Continued)

*Primary Examiner* — Stephen P Avila
(74) *Attorney, Agent, or Firm* — James Creighton Wray

(57) ABSTRACT

An arrangement for remotely controlling the position of a trawl door (1) or deflector for seismic surveys comprises an attachment point provided on a movable part (10). The movable part (10) can be moved in relation to a body of the trawl door (1) by means of a remotely controlled actuator. The movable part (10) with the attachment point (15) for a towing line is provided at the body or at a centre rib of the body of the trawl door (1). The movable part (10) with the attachment point can be moved substantially in vertical direction and approximately at right angles in relation to the direction of movement of the trawl door (1) when operated at sea, thereby resulting in an upwards or downwards movement of the trawl door (1) and thereby providing continuous adjustment of depth at which the trawl door (1) operates in the water.

15 Claims, 4 Drawing Sheets

(51) Int. Cl.
*A01K 73/045* (2006.01)
*A01K 73/05* (2006.01)
*A01K 73/04* (2006.01)

(56) References Cited

U.S. PATENT DOCUMENTS

| | | | | |
|---|---|---|---|---|
| 4,890,568 | A | * | 1/1990 | Dolengowski .......... B63B 21/66 |
| | | | | 114/163 |
| 8,479,676 | B2 | * | 7/2013 | Kurpiewski ............. B63G 8/42 |
| | | | | 114/245 |
| 2006/0176774 | A1 | | 8/2006 | Toennessen |
| 2009/0040873 | A1 | | 2/2009 | Schreurs |
| 2012/0222607 | A1 | * | 9/2012 | Stokkeland .......... A01K 73/045 |
| | | | | 114/245 |
| 2014/0109818 | A1 | | 4/2014 | Richer De Forges |
| 2016/0061980 | A1 | * | 3/2016 | Tonchia ............... G01V 1/3808 |
| | | | | 701/21 |

FOREIGN PATENT DOCUMENTS

| | | | |
|---|---|---|---|
| GB | 961742 | A | 6/1964 |
| GB | 2115661 | A | 9/1983 |
| GB | 2122562 | A | 1/1984 |
| WO | 9824685 | A1 | 6/1998 |
| WO | 2004086092 | A2 | 10/2004 |
| WO | 2005055708 | A1 | 6/2005 |
| WO | 2010019049 | A1 | 2/2010 |

\* cited by examiner

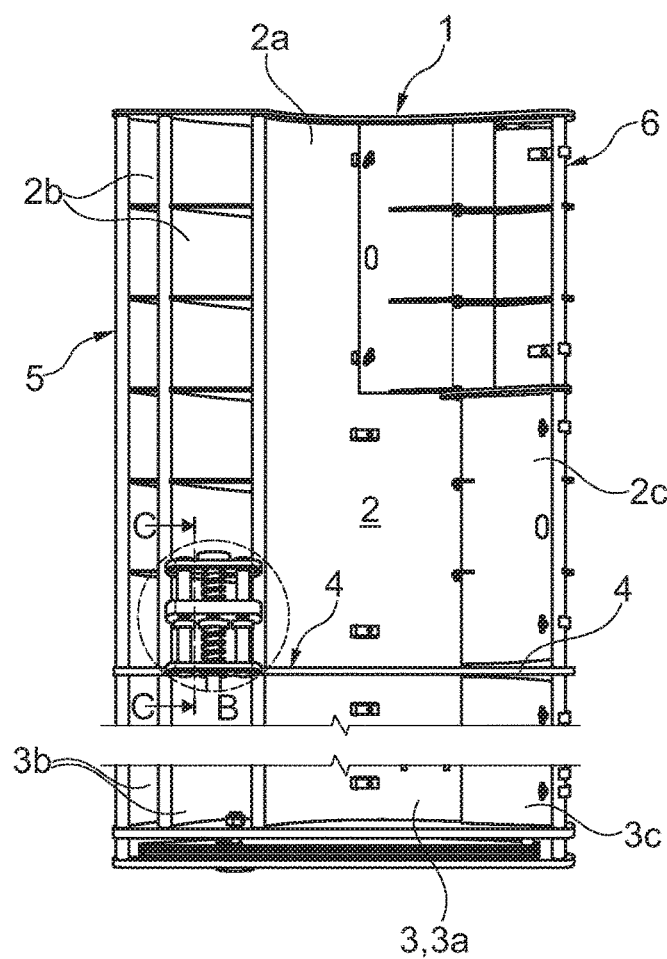
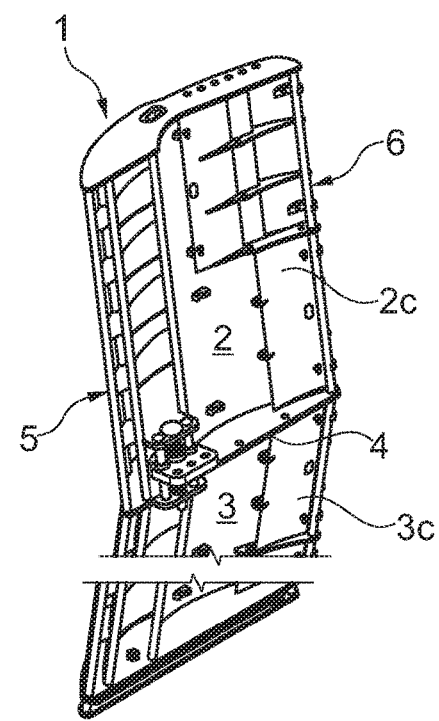
Fig. 1
Fig. 2
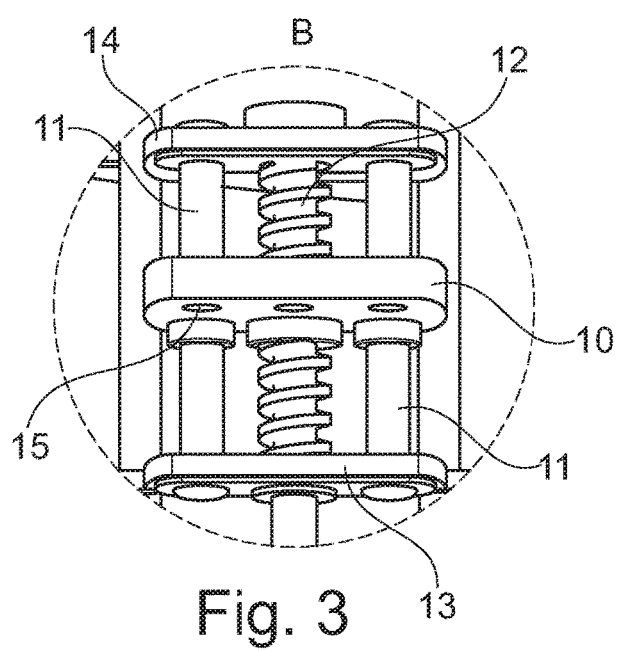
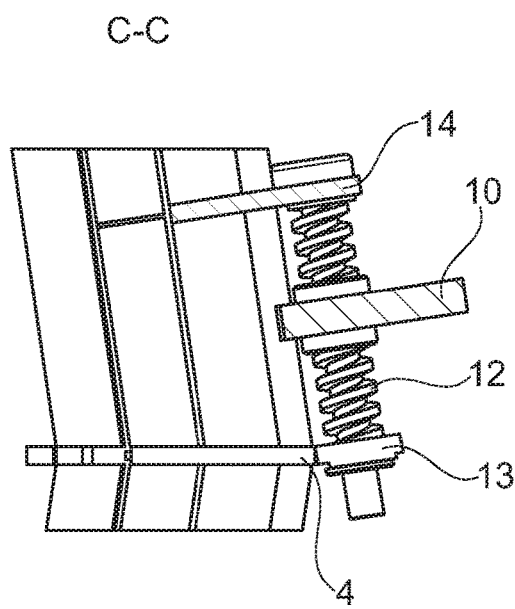
Fig. 3
Fig. 4

ARRANGEMENT FOR ATTACHING A TOWING LINE TO A SPREADING DEVICE

This application claims the benefit of Danish Application No. PA 2016 70156 filed Mar. 18, 2016, Danish Application No. PA 2016 70711 filed Sep. 15, 2016 and PCT/DK2017/050077 filed Mar. 17, 2017, International Publication No. WO 2017/157400 A1, which are hereby incorporated by reference in their entirety as if fully set forth herein.

FIELD OF THE INVENTION

The present invention concerns an arrangement for connecting a towing line to a spreading device, such as a trawl door or a paravane or deflector for seismic equipment, to be towed by a vessel at sea for controlling the position of the spreading device. The invention also concerns a method for remotely controlling the position of the spreading device.

BACKGROUND OF THE INVENTION

Various devices and arrangements for remotely controlling the lateral positions of trawl doors or deflectors are known. Examples of the prior art are disclosed in WO 98/24685, WO 2005/055708, WO 2004/086092 and WO 2010/019049.

GB 2122562 discloses a spreading device in the form of a paravane or pelagic trawl door with an arrangement for remote control. The angle of attack of the paravane can be changed by moving a bridle head containing the attachment point for the towing line. Three bridle legs connect the bridle head with the body of the paravane. The point where rear bridle leg is connected to the body of the paravane is movable in horizontal direction when operated at sea by a screw spindle of an electric motor. This prior art arrangement is only capable of changing the angular position of the paravane about a vertical axis when used as a spreading device, thereby changing the lateral position of the spreading device relative to the direction of movement in the water. Also, the bridle arrangement is cumbersome and vulnerable when handling on a fishing trawler at sea, where the attachment point is provided close to the body of the spreading device, especially in case of trawl doors used for trawl fishing.

DESCRIPTION OF THE INVENTION

The invention provides an arrangement for connecting a towing line to a spreading device, such as a trawl door or a deflector for seismic equipment, to be towed by a vessel at sea for controlling the position of the spreading device, the arrangement comprising an attachment point for the towing line and including a movable part comprising the attachment point, wherein the movable part is capable of being moved in relation to a body of the spreading device by means of an actuator.

The arrangement according to the invention is peculiar in that the movable part with the attachment point is provided at the body of the spreading device or at a centre part of the body of the spreading device.

By the invention there are no bridle legs extending from the body of the spreading device to interfere with when handling the spreading device on board a vessel, providing a much more robust construction and operation. If the spreading device is a V-shaped, straight or Y-formed trawl door, the centre part at the front or inner side of the spreading device will be preferred to arranged the movable part on. Otherwise the movable part can be attached to the body of the spreading device at the outer or rear side, for example at the top or bottom of the spreading device.

In an embodiment of the invention, the movable part with the attachment point can be moved substantially in vertical direction and approximately at right angles in relation to the direction of movement of the spreading device when operated at sea. The movement of the attachment point will cause a displacement of the point of attack of the towing force from a vessel, thereby tilting the trawl door. If the spreading device is a V-shaped, straight or Y-formed trawl door, the tilting, meaning an angular displacement of the door, will cause the door to move up or down in the water, depending on the direction of movement of the attachment point. The trawl door can thereby be adjusted during operation at sea.

The advantages of the invention are also achieved by the method according to the invention for remotely controlling the position of a spreading device, such as a trawl door or a deflector for seismic surveys, which is towed by a vessel at sea, the spreading device comprising an arrangement with an attachment point for the towing line, wherein the arrangement includes a movable part comprising the attachment point, the movable part with the attachment point being provided at the body of the spreading device, wherein the movable part is moved in relation to a body of the spreading device by means of a remotely controlled actuator so that the point of attack of a towing force on the spreading device is changed.

The actuator used for moving the movable part can be electric, pneumatic, hydraulic, magnetic, with piston and cylinders, or with spring actuation, with spindle and screw thread, rack and pinion, or powered by water flowing past the spreading device.

The remote control from a station or handheld device on board the vessel can be provided by wired, i.e. by cable connection, or wirelessly by radio or acoustic signals. Alternatively, control of the actuator can be provided by or combined with autonomous control means such as a control unit comprising a GPS receiver or a pressure-sensitive/depth gauge unit.

Power sources and communication equipment can be located anywhere on at least one spreading device or on a separate communication station. Power sources and communication equipment do not need to be located close to each other and can be located on separated units. The arrangement can be used with all kinds of spreading devices that have at least one attachment point. The arrangement can be applied to one spreading device of a pair of spreading devices, or to one or more of a plurality of spreading devices. In the case of a system with multiple spreading devices, the arrangement on each spreading device can work in parallel or independently. In the case of electric powered equipment system, the electric storage can be rechargeable via cable or any kind of generators. At least one or all charging systems can be used at same time.

Overall in the industry, the method of changing the position of a spreading device, its angle of attack or pitch and roll can be a time-consuming process and dangerous as it is necessary to pull the spreading device up from the water to the vessel or on board the vessel. During this operation, valuable operation time is lost on the vessel. Connecting units, such as a shackles, connectors or hooks need to be disconnected and reconnected at different positions and the spreading devices is/are then set back to the water. With this remotely controlled unit, we can minimise the risk of accident by escaping the above dis- and reconnection of towing lines to the spreading device. Further advantages is that will be possible to control the vertical position of the spreading device simultaneously or independently while the spreading device is in full operation in the water to chase and catch the target with the remotely controllable attachment points. Especially in areas with side current, where a known problem is that the towed spreading device is strongly affected by the water flow and tends to position itself in an unwanted position. The remotely controlled attachment points will maximise the efficiency of the spreading device and catch. Also, the arrangement will minimise repair cost, increase catch, and maximise stability on towed device.

DESCRIPTION OF THE DRAWING

Examples of embodiments of the invention will be described below with reference to the drawing, in which:

FIG. 1 shows a front view of a spreading device provided with a first embodiment of an arrangement according to the invention;

FIG. 2 shows the spreading device of FIG. 1 in a perspective view from above;

FIG. 3 is a detail designated B of the inventive arrangement on FIG. 1;

FIG. 4 shows a sectional view C-C on FIG. 1;

DESCRIPTION OF EMBODIMENTS OF THE INVENTION

Figure 7:
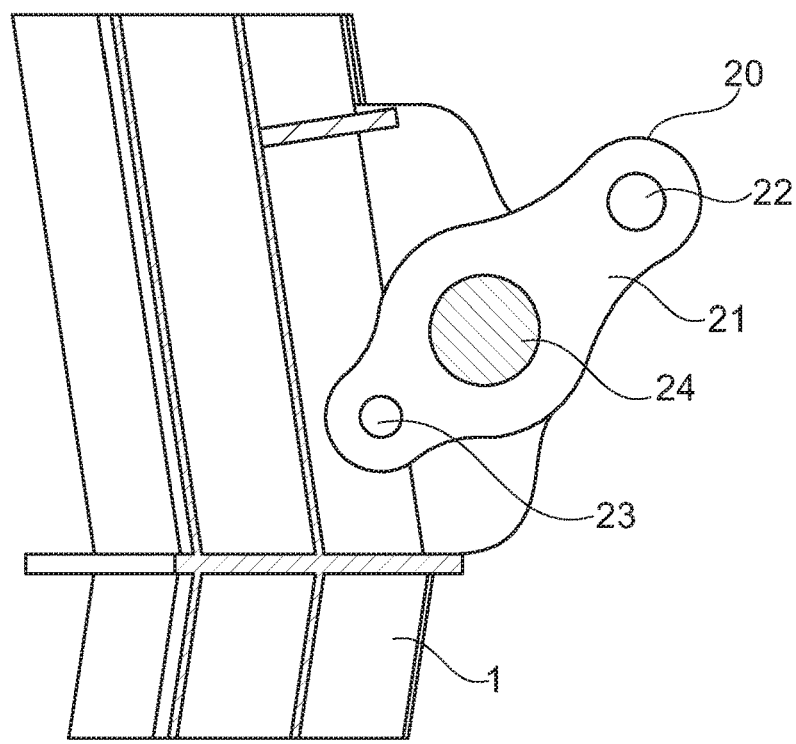
FIG. 7 shows a sectional view of the detail on FIG. 6.

An embodiment of the invention is provided on a spreading device in the form of a V-shaped, straight or Y-formed trawl door 1 composed of upper and lower body or single body shaped spreading device parts 2 and 3 that are joined by a centre rib 4. The rib 4 extends from the leading edge 5 to the trailing edge 6 of the trawl door 1. The body is composed of a main body 2a, 3a, leading foils 2b, 3b and trailing foil 2c, 3c, a very common design in the industry. By the prior art trawl doors, the centre rib is normally provided with a series of holes in which hooks or shackles can be fastened for connection with a towing line, i.e. chain or wire, for towing by a fishing trawler.

I this embodiment, the arrangement according to the invention is provided by a movable part 10 which is arranged slidable on guides 11 between which a screw spindle 12 is provided in engagement with an internal thread in the movable part 10. The guides 11 and the spindle 12 are seated in lower and upper plate pieces 13, 14 welded to the centre rib 4 and to edges of main body 2a and one of the foils 2b, respectively. The movable part 10 is provided with attachment points for a towing line in the form of through-going holes 15. By rotating the spindle 12, the movable part 10 can be moved up and down along the guides 11 approximately in parallel with the upper body part 2 and thereby substantially vertically when the trawl door is in operation and used as spreading device for a trawl net.

The rotation of the spindle 12 can be provided by an actuator in the form of an electric motor (not shown), alternatively by another rotary motor, which could be pneumatic, hydraulic or magnetic. Electric energy for the electric motor could be provided by a cable from the towing vessel, by a rechargeable battery, or by local power generating means on the spreading device, for example a small water turbine, or a combination of any of these.

When the part 10 is moved up as seen on the Figures, the point of attack of the towing force by the not shown towing line is displaced upwards. This action will have an impact on the position of the trawl door, which in operation is kept in balance by the combined forces from the towing line to the vessel, from the line or lines on the other side to the fishing trawl and from the force of the water flowing past the door, thus causing the door to tilt "inwards", meaning towards the viewer on FIG. 1 and towards the right on FIG. 4. Due to the hydrodynamic forces on the trawl door, this angular change of the trawl door 1 will mean a resulting force upward on the trawl door 1, moving the door to a higher level in the water until the forces on the trawl door are in balance again. The opposite movement of the part 10 will mean a corresponding downward change in position and movement of the trawl door 1. When combined with a remote control, a tedious and time-consuming adjustment of the attachment point or the towing line is thereby avoided by the simple and robust arrangement according to the invention.

Figure 6:
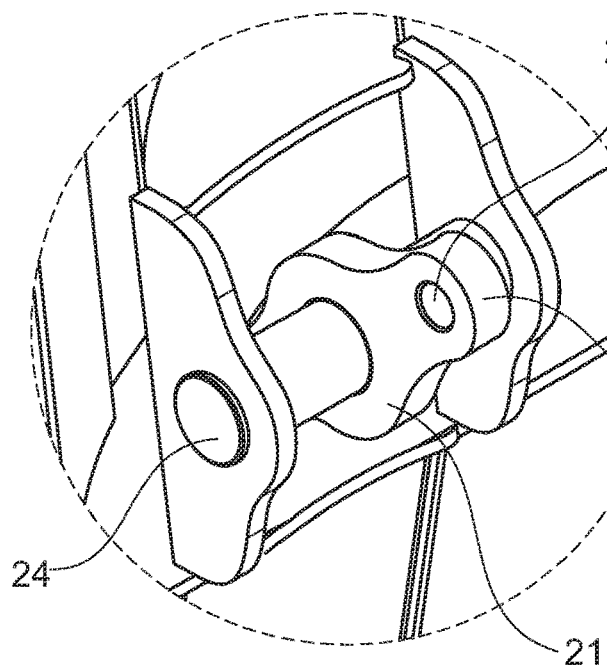
FIG. 6 shows a detail A of the arrangement on FIG. 5.
Figure 5:
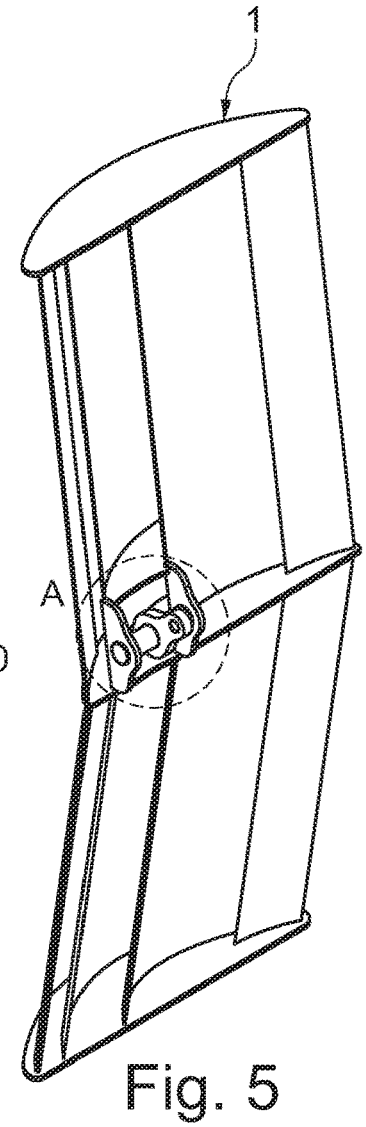
FIG. 5 shows a perspective view of a second embodiment of an arrangement according to the invention.

Other embodiments of the arrangement according to the invention are possible. In a second embodiment, instead of a screw spindle a movable part 20 shown on FIGS. 5-7 can provide an up and down displacement by lever 21 actuated by a not shown actuator. The attachment point 22 is here provided at the end of the lever 21, and the not shown actuator, which may be of any known type or as described in the present specification, acts on the other end 23, providing a rotation around a journal or axle 24 fastened to the trawl door.

Figure 8:
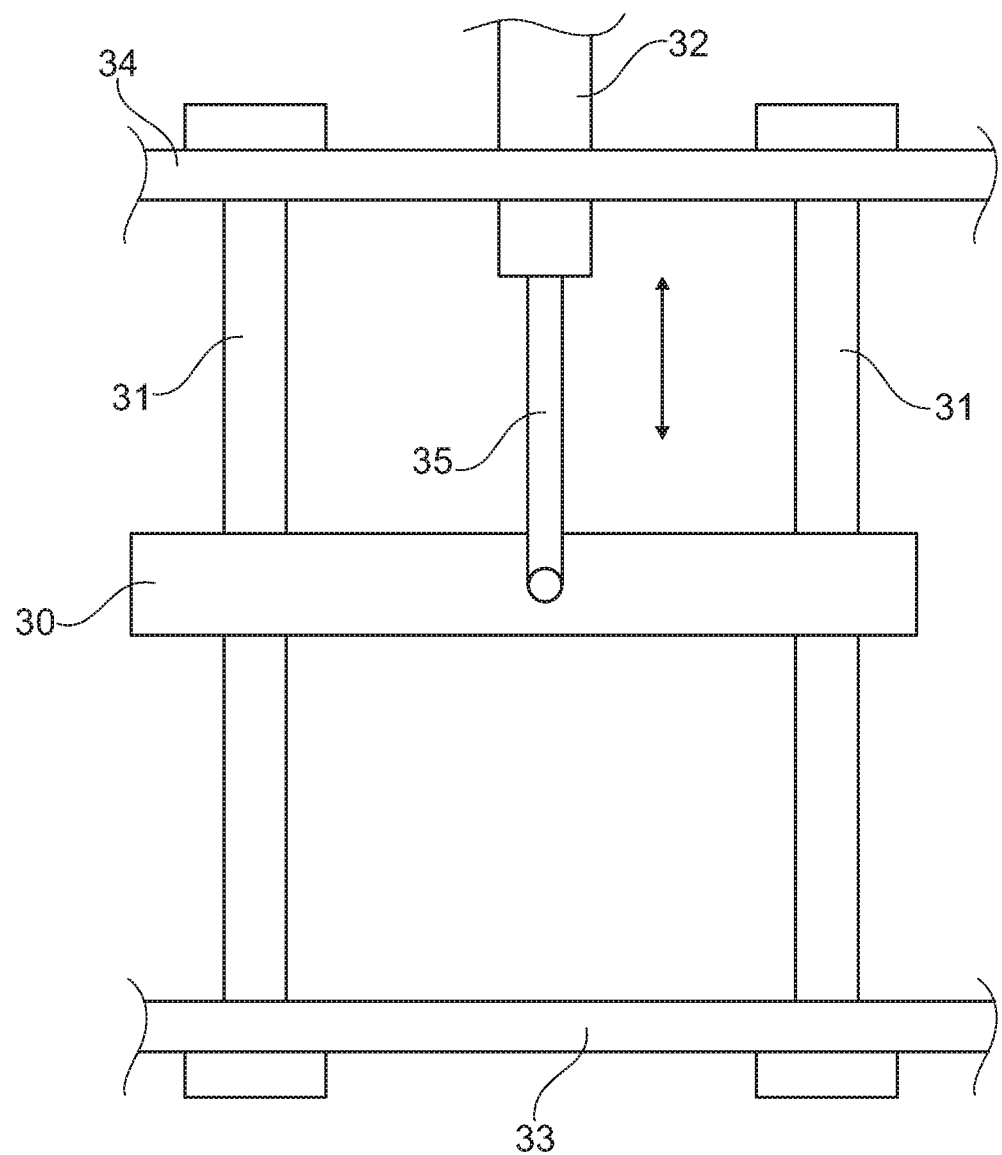
FIGS. 8 and 9 show two additional variants of of the first embodiment of the arrangement according to the invention.
Figure 9:
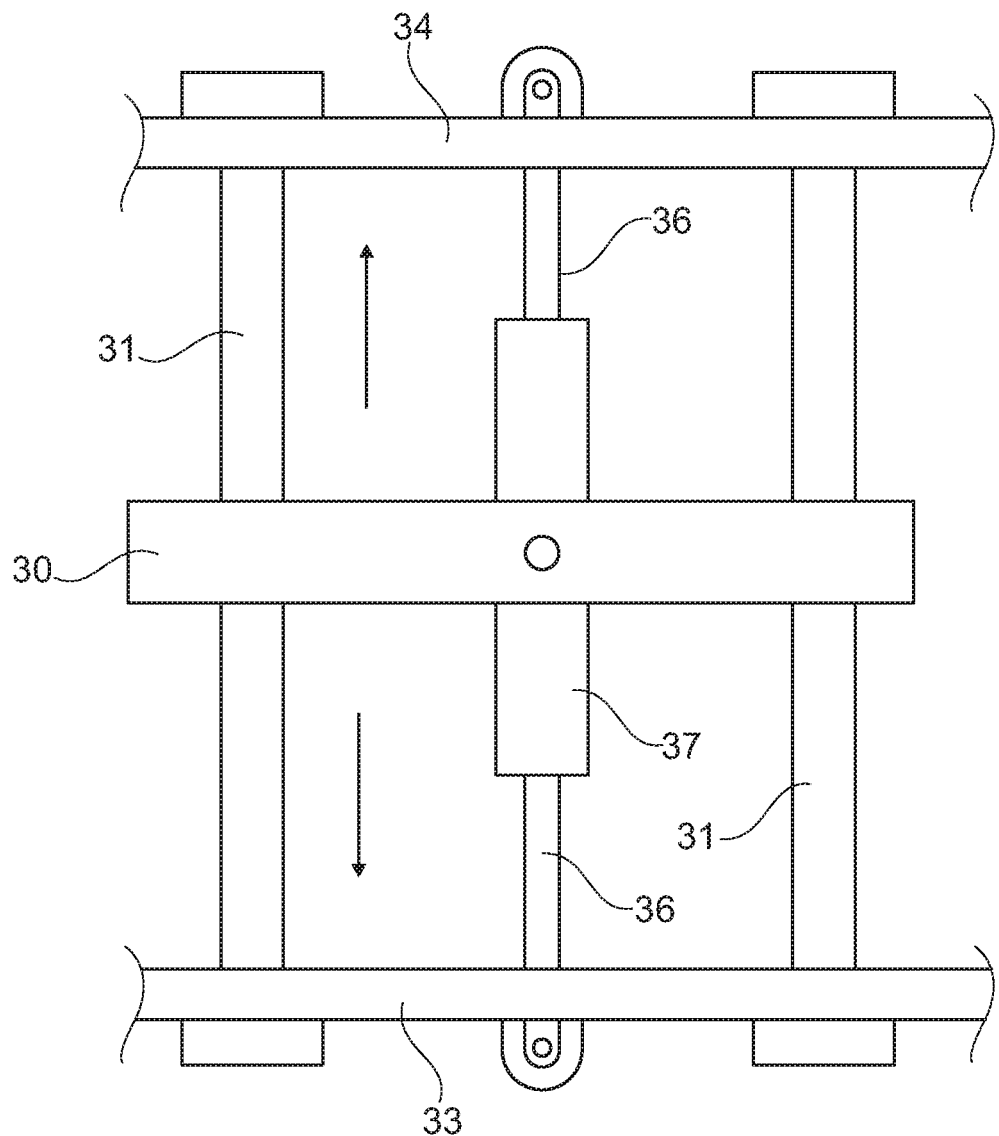

In FIGS. 8 and 9 appear further variants of the first embodiment of invention, where the means for adjusting the movable part 30 up and down can be provided by a hydraulic cylinder 32, 37. On FIG. 8, the cylinder 32 is attached to an upper plate piece 34 with a spindle 35 connected with the movable part 30 having the attachment point for the towing line (not shown). The movable part 30 is slidable on guides 31 extending between lower and upper plate pieces 33 and 34. The other variant on FIG. 9 is similar by having the movable part 30 seated sliding on guides 31 that extend between lower and upper plate pieces 33 and 34. The variant on FIG. 9 differs by having a hydraulic cylinder 37 attached to and extending through the movable part 30, with a through-going spindle 36 extending oppositely at both ends of the cylinder 37. The ends of the spindle 36 are fastened to the lower and upper plate pieces 33 and 34, respectively.

The embodiments on FIGS. 8 and 9 are provided by pressurised liquid from a not shown hydraulic system comprising valves, piping and hoses for conducting the liquid as well as a hydraulic pump and driving means for the pump. The hydraulic system can be located on the trawl door, preferably provided as a unit at the centre rib 4 of the trawl door. The hydraulic system is self-contained such that the energy supply is provided locally, either by a battery-powered electric motor driving a hydraulic pump or by a water turbine utilising the flow of water past the trawl door. A water turbine may either drive a hydraulic pump directly, possibly through a gearing, or drive a generator which in turn drives an electric motor for the hydraulic pump. These means may readily be provided by the skilled in the art. Thereby, the control and adjustment of the attachment point for the towing line of the trawl door is only dependent on remote control signals from the trawler for operation.

The arrangement according to the invention can also be designed with the movable part with the attachment point to be moved substantially in horizontal direction when the spreading device is operated at sea. The angle of attack of the trawl door is thereby changed, causing a lateral adjustment of the trawl door in the water.

In the above described embodiments of the invention, the arrangement of the movable part with attachment point is provided at the inner side of the spreading device in the form of a trawl door and close to a horizontal central plane of the device. However, in a further embodiment of the invention, the arrangement can be provided at the outer side of the spreading device, for example at the top and bottom of a trawl door at points where the towing lines to the trawl net are connected. Thereby may be provided a possibility of a similar adjustment of the attachment point, either longitudinally of the trawl door or up and down of the trawl door.

Other kinds of actuators are possible, for example in the form of pneumatic actuators. In case of pneumatic actuator, the compressed air can be stored in a pressure container located on the spreading device.

The invention claimed is:

1. An arrangement for connecting a towing line to a spreading device, such as a trawl door or a deflector for seismic equipment, to be towed by a vessel at sea for controlling the position of the spreading device, the arrangement comprising an attachment point for the towing line and including a movable part comprising the attachment point, wherein the movable part is capable of being moved in relation to a body of the spreading device by means of an actuator, wherein the movable part with the attachment point is provided at the body of the spreading device or at a centre part of the body of the spreading device, wherein the movable part with the attachment point can be moved substantially in vertical direction and approximately at right angles in relation to the direction of movement of the spreading device when operated at sea.

2. An arrangement according to claim 1, wherein the movable part with the attachment point can be moved substantially in horizontal direction when the spreading device is operated at sea.

3. An arrangement according to claim 2, wherein the actuator includes a actuator operating by pressurised fluid.

4. An arrangement according to claim 2, wherein the actuator is a hydraulic cylinder acting substantially in vertical direction when in use.

5. An arrangement according to claim 3, wherein the pressurised fluid is provided by a source of energy located on the spreading device.

6. An arrangement according to claim 5, wherein the source of energy is a hydraulic pump powered by a water turbine or by a motor with an electric battery.

7. An arrangement according to claim 1, wherein the actuator includes a screw spindle engaging a screw thread on the movable part and drivingly connected to a motor.

8. An arrangement according to claim 7, wherein the motor is an electric motor.

9. An arrangement according to claim 7, wherein the actuator can be supplied with energy by rechargeable energy storage means and/or a generator provided on the spreading device.

10. An arrangement according to claim 7, wherein the actuator is supplied with energy through a cable connected with the towing vessel.

11. An arrangement according to claim 1, wherein remote control of the actuator is provided by a signal transmitted via a cable connected to the towing vessel.

12. An arrangement according to claim 1, wherein remote control of the actuator is provided by a signal transmitted by wireless means, e.g. acoustic or electromagnetic waves emitted by a transmitter on board the vessel.

13. An arrangement according to claim 1, wherein the control of the actuator is provided by or combined with autonomous control means such as a control unit comprising a GPS receiver or a pressure-sensitive/depth gauge unit.

14. A method for remotely controlling the position of a spreading device, such as a trawl door or a deflector for seismic surveys, which is towed by a vessel at sea, the spreading device comprising an arrangement with an attachment point for the towing line, wherein the arrangement includes a movable part comprising the attachment point, the movable part with the attachment point being provided at the body of the spreading device, wherein the movable part is moved in relation to a body of the spreading device by means of a remotely controlled actuator so that the point of attack of a towing force on the spreading device is changed, wherein the movable part with the attachment point in operation at sea is moved substantially in vertical direction and approximately at right angles in relation to the direction of movement of the spreading device such that the angular position of the spreading device in relation to vertical is changed.

15. A method according to claim 14, wherein the movable part with the attachment point in operation at sea is moved substantially in horizontal direction such that the angle of attack of the spreading device with regard to the water flowing past the spreading device is changed.

* * * * *